United States Patent
Dingl et al.

(10) Patent No.: US 7,628,061 B2
(45) Date of Patent: Dec. 8, 2009

(54) METHOD FOR DETECTING THE AMBIENT PRESSURE IN AN INTERNAL COMBUSTION ENGINE

(75) Inventors: Jürgen Dingl, Regensburg (DE); Gerhard Eser, Hemau (DE); Gerhard Schopp, Pettendorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/792,045

(22) PCT Filed: Jul. 27, 2006

(86) PCT No.: PCT/EP2006/064756

§ 371 (c)(1),
(2), (4) Date: May 31, 2007

(87) PCT Pub. No.: WO2007/036377

PCT Pub. Date: Apr. 5, 2007

(65) Prior Publication Data

US 2008/0202224 A1 Aug. 28, 2008

(30) Foreign Application Priority Data

Sep. 26, 2005 (DE) ........................ 10 2005 045 857

(51) Int. Cl.
*G01M 15/05* (2006.01)
(52) U.S. Cl. ............................................. 73/114.37
(58) Field of Classification Search ............... 73/114.31, 73/114.32, 114.33, 114.36, 114.37
See application file for complete search history.

(56) References Cited

U.S. PATENT DOCUMENTS

| | | | |
|---|---|---|---|
| 5,631,412 A * | 5/1997 | Tomisawa | 73/114.32 |
| 6,430,515 B1 | 8/2002 | Sanyal et al. | |
| 6,502,545 B1 | 1/2003 | Ganser et al. | |
| 6,505,505 B1 * | 1/2003 | Henzinger et al. | 73/114.18 |
| 6,698,203 B2 * | 3/2004 | Wang | 60/611 |
| 6,850,833 B1 * | 2/2005 | Wang et al. | 701/108 |
| 6,983,646 B2 * | 1/2006 | Sawada et al. | 73/114.37 |
| 7,133,765 B2 * | 11/2006 | Beyer et al. | 701/114 |
| 7,293,452 B2 * | 11/2007 | Vibert et al. | 73/114.36 |
| 2003/0037770 A1 * | 2/2003 | Kishibata et al. | 123/478 |
| 2004/0244471 A1 * | 12/2004 | Sawada et al. | 73/116 |
| 2007/0289564 A1 * | 12/2007 | Dingl et al. | 123/90.17 |

FOREIGN PATENT DOCUMENTS

| | | |
|---|---|---|
| DE | 39 14 784 A1 | 11/1990 |
| DE | 199 64 193 A1 | 8/1999 |
| DE | 199 19 931 B4 | 11/1999 |
| DE | 100 39 953 C1 | 4/2002 |

\* cited by examiner

*Primary Examiner*—Eric S McCall
(74) *Attorney, Agent, or Firm*—King & Spalding L.L.P.

(57) ABSTRACT

There is described a method for detecting the ambient pressure by a pressure sensor in the intake pipe of an internal combustion engine. A throttle flap is opened so that the pressure drop via the throttle flap can be neglected. The dethrottling of the internal combustion engine is compensated by the appropriate adjustment of the cam shaft in accordance with the operating state of the internal combustion engine, so that the measuring method is not being felt by the driver.

12 Claims, 3 Drawing Sheets

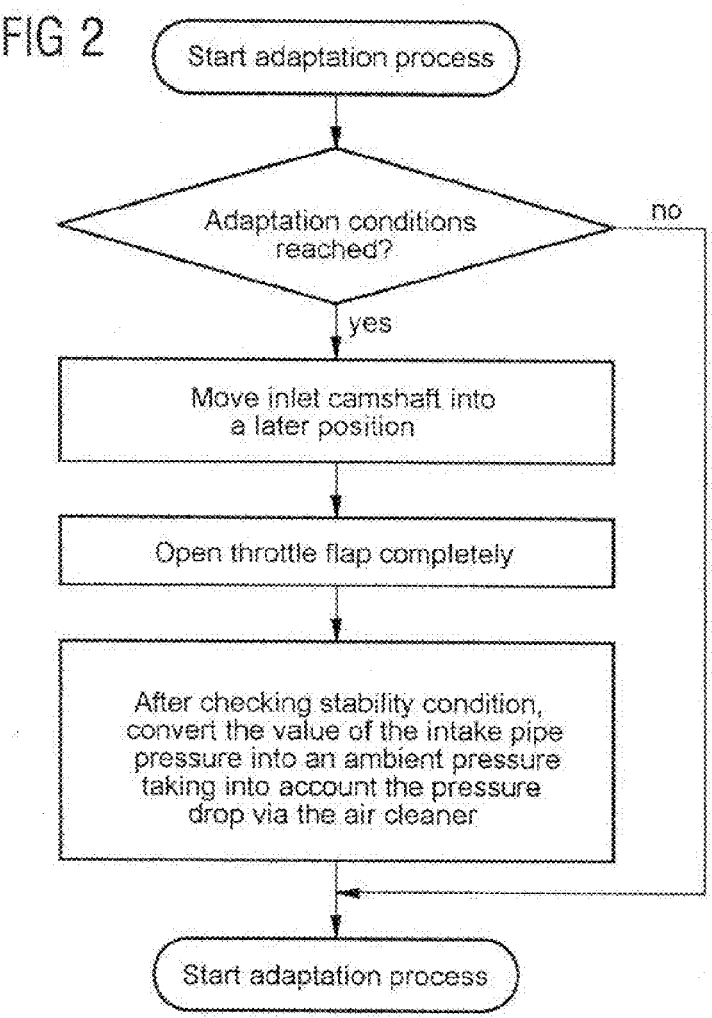
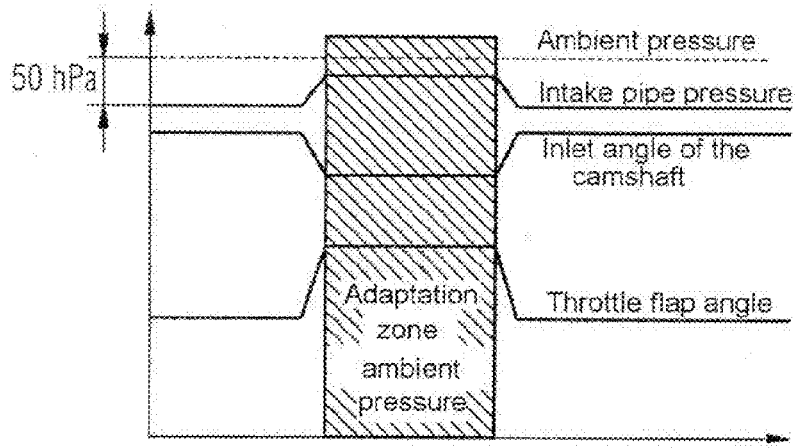

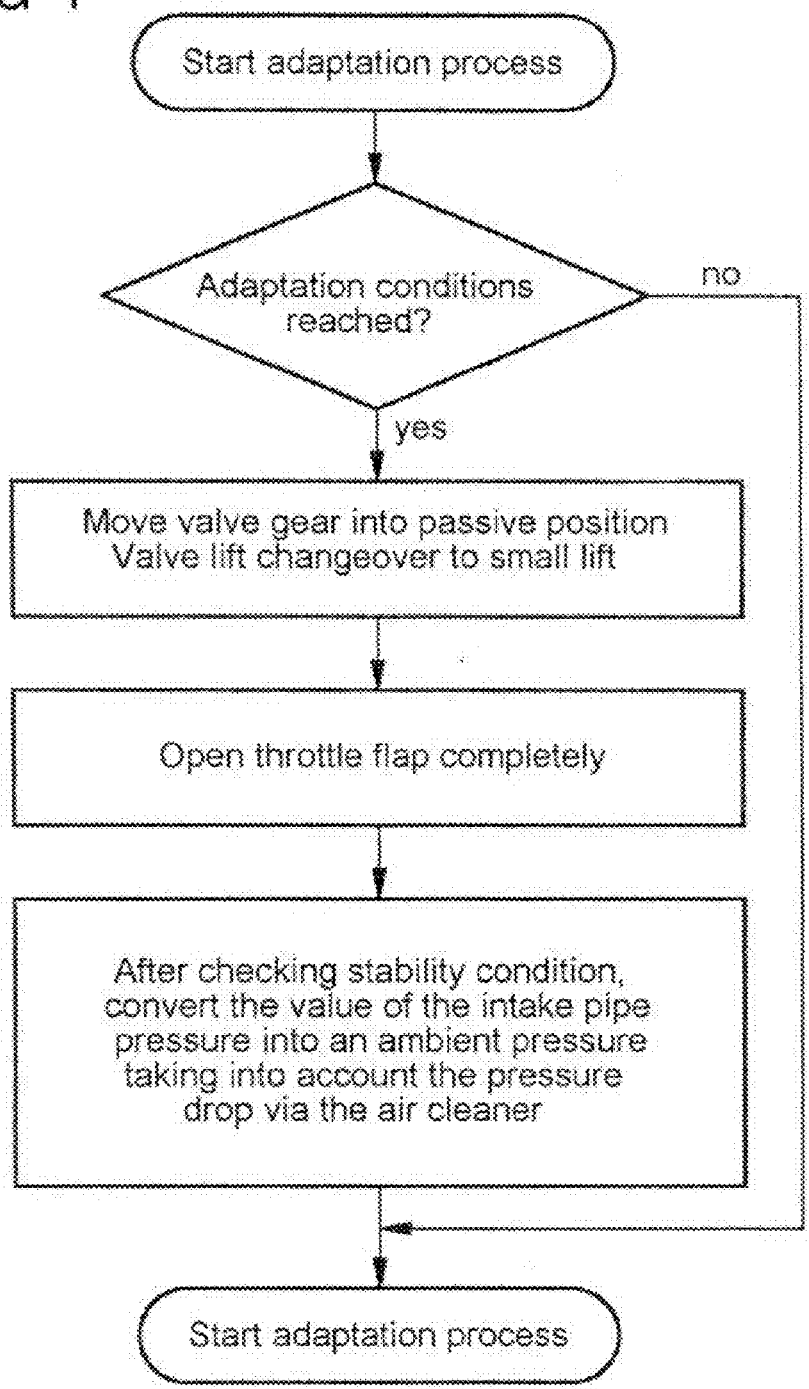

METHOD FOR DETECTING THE AMBIENT PRESSURE IN AN INTERNAL COMBUSTION ENGINE

CROSS REFERENCE TO RELATED APPLICATIONS

This application is the US National Stage of International Application No. PCT/EP2006/064756, filed Jul. 27, 2006 and claims the benefit thereof. The International Application claims the benefits of German application No. 10 2005 045 857.2 DE filed Sep. 26, 2005, both of the applications are incorporated by reference herein in their entirety.

FIELD OF INVENTION

The present invention relates to a method for detecting the ambient pressure by means of a pressure sensor in the intake pipe of an internal combustion engine.

BACKGROUND OF INVENTION

Knowledge of the ambient pressure represents an important variable for operation of internal combustion engines. In accordance with a first known alternative the ambient pressure is measured directly with the aid of an ambient pressure sensor. In accordance with a further alternative, in pressure-controlled systems, i.e. a pressure sensor is located in the intake pipe of the internal combustion engine, the ambient pressure is estimated with the aid of a prediction process. For internal combustion engines with lift changeover (for example two-stage) attempts are further made, even with "unthrottled" operation of the internal combustion engine, to still maintain a specific pressure difference to the environment. This pressure difference is used for venting air from the tank or for filling the brake servo. The previous prediction methods however did not take account for example in full-load operation of the internal combustion engine of this residual pressure difference.

The ambient pressure is detected in pressure-controlled systems of the prior art in the following manner. Before the internal combustion engine is started the intake pipe pressure corresponds to the ambient pressure of the internal combustion engine. In the area close to full load the ambient pressure is estimated based on the measured intake pipe pressure with an almost open throttle flap. With a closed throttle flap in the overrun mode of the internal combustion engine a specific pressure arises in the intake pipe after a certain time. From this pressure the ambient pressure is likewise estimated, whereas this estimation however, because of manufacturing tolerances of the throttle flap, is very imprecise.

SUMMARY OF INVENTION

An object of the present invention is thus to provide a method for determining the ambient pressure with the aid of the pressure sensor in the intake pipe of the internal combustion engine which is able to be used in different operating modes or load ranges of the internal combustion engine.

The above object is achieved by the invention defined in an independent claim. Preferred embodiments and further developments of the present invention emerge from the description given below, from the drawings and from the subsequent claims.

The present invention comprises a method for detecting the ambient pressure through a pressure sensor in the intake pipe of an internal combustion engine. The method has the following steps: Determining an air cleaner pressure at an air cleaner of the internal combustion engine as a function of an air mass flowing in through the air cleaner, opening a throttle flap of the internal combustion engine until a drop in pressure via the throttle flap is negligible, adjusting the camshaft as a function of the operating state of the internal combustion engine such that the operating state of the internal combustion engine, despite the opening of the throttle flap, remains practically constant, and detecting an intake pipe pressure through the pressure sensor in the intake pipe and determining the ambient pressure from the total of the air cleaner pressure and of the intake pipe pressure.

The inventive method makes possible a more exact determination of the ambient pressure with the aid of the pressure sensor in the intake pipe by comparison with prior art methods. This is based on the known pressure conditions in the intake pipe, i.e. the ambient pressure is equal to the total of the sub-pressures at the throttle flap, the air cleaner and in the intake pipe collector. To enable the ambient pressure to be determined from the measured values of the pressure sensor in the intake pipe collector, the internal combustion engine is dethrottled far enough, i.e. the throttle flap is opened wide enough for the drop in pressure at the throttle flap to become negligibly small. This method is executed in the widest variety of operating states of the internal combustion engine, i.e. in the part-load, full-load and overrun mode of the internal combustion engine. The dethrottling of the internal combustion engine however leads to an undesired change in the operating state of the internal combustion engine. Thus for example in part load mode a higher torque would be created by the internal combustion engine by the dethrottling. In overrun mode in its turn the dethrottling leads to a reduced braking effect of the internal combustion engine. To prevent this undesired operating state of the internal combustion engine or at least to minimize it far enough for it not to be noticeable to the driver, the opening of the throttle flap is compensated for by an adjustment of the camshaft depending on the operating state of the internal combustion engine.

To this end, in part-load or full-load operation of the internal combustion engine for example, the camshaft, especially the inlet camshaft(s), is or are adjusted to "early" in order to prevent an increase in the torque of the internal combustion engine through the dethrottling. To enable the change in the operating state through dethrottling of the internal combustion engine to be prevented even more effectively, the ambient pressure is preferably only defined in operating states of the internal combustion engine which can be implemented with a small valve lift. To supplement this the camshaft is adjusted to a "small valve lift" in order to minimize the influence of the dethrottling on the operating state.

In overrun mode, according to a preferred embodiment of the invention, the camshaft is adjusted such that no valve overlaps occur. A further measure consists of adjusting the camshaft to "small valve lift" to maintain the braking effect of the internal combustion engine at an almost constant level despite the opening of the throttle flap.

BRIEF DESCRIPTION OF THE DRAWINGS

The preferred embodiments of the present invention are explained in greater detail, with reference to the accompanying drawing. The figures show.

DETAILED DESCRIPTION OF INVENTION

Figure 1:
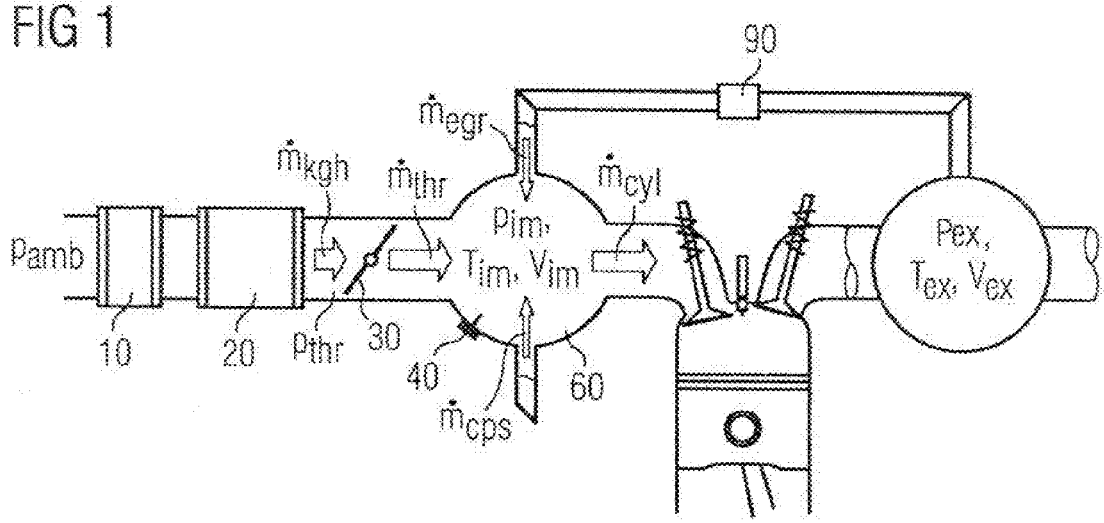
FIG. 1 the intake pipe model of an internal combustion engine without supercharging, FIG. 2 a flow diagram of a preferred embodiment of the method for an internal combustion engine in part-load or full-load operation, FIG. 3 a schematic diagram of the method steps for determining the ambient pressure for an internal combustion engine in part-load or full-load mode, and FIG. 4 a flow diagram of a preferred embodiment of the method for an internal combustion engine in overrun mode.

FIG. 1 shows the intake pipe model an internal combustion engine without a supercharger. The air at the ambient pressure $p_{amb}$ flows on induction via the air cleaner 10 through the air mass meter 20 via the throttle flap 30 into the intake pipe collector 60. In addition an air mass $m_{egr}$ can be introduced through a valve 90 via the exhaust gas recirculation. It is likewise possible for the tank leakage diagnosis pump to feed a fuel/air mixture with the mass $m_{cps}$ to the intake pipe collector.

The intake manifold pressure $p_{im}$ and the intake temperature Tim is detected in the intake pipe for example with a combined pressure-temperature sensor. In the normal case either an intake pipe pressure sensor 40 and/or an air mass sensor 20 is or are built into the intake pipe of the internal combustion engine.

For the case of an opened throttle flap 30 a value is set as the intake manifold pressure $p_{im}$ which can be described by the ambient pressure $P_{amb}$ as well as by the drop in pressure $p_{aircleaner}$ via the air cleaner 10 and the drop in pressure $P_{thr}$ on the overall intake path up to the intake pipe collector 60. After transposition of this relationship the ambient pressure $p_{amb}$ is produced by the following equation:

$$P_{amb} = p_{im} + p_{aircleaner} + p_{thr}.$$

If the throttle flap 30 of the internal combustion engine is completely or almost completely opened, the drop in pressure $p_{thr}$ via the throttle flap 30 can be ignored. The drop in pressure via the air cleaner 10 is able to be described as a function of the inflowing air mass $m_{kgh}$. This thus produces the following functional relationship for the air cleaner pressure $p_{aircleaner}$:

$$p_{aircleaner} = f(m_{kgh}).$$

From the relationship shown above of the pressures able to be determined in the intake pipe it follows that the air cleaner pressure is able to be determined from the mass throughput through the intake pipe and the air pressure $p_{im}$ in the intake pipe collector with the aid of the pressure sensor 40. The total of these two pressures $p_{aircleaner}$ and $p_{im}$ supplies the ambient pressure, provided the pressure drop at the throttle flap 30 is negligible.

The simplified description for the pressure relationships in the intake pipe of the internal combustion engine given above can be used for the determination of the ambient pressure of the internal combustion engine in different operating modes. These operating states are subdivided into two groups, part-load and full-load mode, as well as overrun mode of the internal combustion engine. In part-load or full-load mode of the internal combustion engine for example the inflowing air mass is able to be estimated sufficiently accuracy in the case of a defined position of the valve gear of the internal combustion engine. Based on this precise estimation it is not necessary to install an air mass meter in the intake pipe of the internal combustion engine. In order to now determine the ambient pressure $p_{amb}$ for an internal combustion engine in part-load or full-load mode, the process depicted schematically in FIGS. 2 and 3 is applied. Before application of the process a check must first be made on the current operating mode of the internal combustion engine. Further boundary conditions of the internal combustion engine to be checked are the engine speed and whether the valve drive system and air intake system are functioning correctly.

If these boundary conditions or adaptation conditions are fulfilled, in the next method step the valve gear is moved to a defined position by an adjustment of the camshaft. This is preferably the "early" camshaft adjustment which adjusts the valves to a passive position with a small valve lift. As the next step the throttle flap 30 is almost completely opened, so that the pressure drop via the throttle flap 30 is negligibly small. In this way the ambient pressure $p_{amb}$ can be estimated simply and precisely, taking into account the intake pipe pressure $p_{im}$, since the air mass flow via the air cleaner 10 is known. The dethrottling of the internal combustion engine by opening the throttle flap is compensated for with the aid of adjustments to the camshaft, so that the driver of the motor vehicle does not notice any change in the operating state of the internal combustion engine through the dethrottling.

As soon as the intake pipe pressure has been detected with the aid of the pressure sensor 40, a further evaluation determines the ambient pressure $p_{amb}$ from the total of the intake pipe pressure $p_{im}$ and the air cleaner pressure $p_{aircleaner}$. In this way the above method provides a precise estimation of the ambient pressure $p_{amb}$ with a measurement through the intake pipe pressure sensor. Only the influence of the pressure drop via the air cleaner 10 has to be taken into account, which however is known because of the known air mass throughput as a function of the valve setting.

FIG. 3 shows a further schematic diagram of the adaptation area with the control elements of the present method to be adapted, using an internal combustion engine in full-load mode as an example. In full-load mode of the internal combustion engine with a small valve lift a specific differential pressure to the environment of namely for example 50 hPa must be set in order to guarantee optimum operation of the internal combustion engine. Thus for determining the ambient pressure $p_{amb}$ the throttle flap 30 is completely opened, which is indicated by the rising curve labeled throttle flap angle. This means that in the adaptation area, i.e. in the area for determining the ambient pressure $p_{amb}$, the drop in pressure $p_{thr}$ via the throttle flap 30 is negligible. To keep the torque at the clutch of the internal combustion engine constant as a result of the dethrottling, the camshaft position will be adjusted to "early". This is represented by the curve labeled inlet angle of the camshaft, which in the adaptation area shows a section lying lower than the rest of the curve. The adjustments made in the intake pipe area cause the intake pipe pressure to increase in the adaptation area, which is represented schematically by the curve with labeled intake pipe pressure. The remaining difference between intake pipe pressure and ambient pressure (see dashed line) within the adaptation area represents the pressure drop via the air cleaner, which however can be derived from the air throughput through the intake pipe.

In accordance with a further embodiment of the present invention the method for determining the ambient pressure via the intake pipe pressure sensor 40 can also be applied to internal combustion engines in overrun mode. Overrun mode in this context means that the internal combustion engine is completely throttled, meaning that the throttle flap 30 is completely closed. FIG. 4 shows a schematic diagram of the method steps.

A first step checks whether the boundary conditions of the present method are fulfilled. In the same way as the above description, these are establishing the operating state of the internal combustion engine, determining the engine speed, the presence of an error-free system in respect of valve gear and air supply system, to give just a few examples. If these boundary conditions or adaptation conditions are fulfilled, the method is continued using the pressure relationship shown above in the intake pipe model.

Since the internal combustion engine is in overrun mode, the throttle flap 30 must be opened far enough for the drop in pressure via the throttle flap 30 to be negligibly small. The dethrottling of the internal combustion engine may not however change the braking effect of the internal combustion engine enough for the driver or user of the internal combustion engine to notice the measurement process for determining the ambient pressure running in the background. To compensate for the dethrottling of the internal combustion engine the camshaft is thus moved into a previously defined position, for example in the end position with a small cam lift, so that with an opened throttle flap sufficient engine braking effect is available.

The valve gear is moved by the adjustment of the camshaft into a passive position, so that a valve lift changeover occurs with a small lift. Since the dethrottling of the internal combustion engine and the adjustment of the camshaft compensate for each other, after stable operating conditions of the internal combustion engine have been established, the value $p_{im}$ of the intake pipe pressure within the intake pipe collector 60 can be detected. The intake pipe pressure $p_{im}$ measured in this way is transferred according to the above equation, taking into account of the pressure drop via the air cleaner 10 into the ambient pressure $P_{amb}$.

With the aid of the method described above a precise estimation of the ambient pressure $p_{amb}$ as a result of the facility for a measurement via the intake pipe sensor 40 is possible. In this context only the influence of the pressure drop via the air cleaner 10 has to be taken into account. In addition the above method stands out by virtue of its rapid detection of the pressure, since a time-consuming estimation method covering the incrementation of the ambient pressure is dispensed with.

The invention claimed is:

1. Method for detecting a ambient pressure, comprising:
providing a pressure sensor in an intake pipe of an internal combustion engine;
determining an air cleaner pressure at an air cleaner of the internal combustion engine as function of an air mass flowing through the air cleaner;
opening a throttle flap of the internal combustion engine;
adjusting a camshaft to remain a operating state of the internal combustion engine essentially constant;
detecting an intake pipe pressure via the pressure sensor; and
determining the ambient pressure based upon a total of the air cleaner pressure and of the intake pipe pressure.

2. The method as claimed in claim 1, wherein the throttle flap is opened until a pressure drop via the throttle flap is negligible.

3. The method as claimed in claim 1, wherein the adjustment of the camshaft is based upon the operating state to remain the operating state despite the opening of the throttle flap.

4. The method as claimed in claim 1, wherein the camshaft is adjusted to early, if the internal combustion engine is in part-load or full-load mode.

5. The method as claimed in claim 4, wherein the adjustment of the camshaft prevents an increase in the torque of the internal combustion engine through the opening of the throttle flap.

6. The method as claimed in claim 1, wherein the camshaft is an inlet camshaft.

7. Method as claimed in claim 1, wherein an operating state in part-load mode capable of a small valve lift is selected, and wherein the camshaft is adjusted to the small valve lift, to keep the operating state of the internal combustion engine essentially constant.

8. Method as claimed in claim 1, wherein an operating state in full-load mode capable of a small valve lift is selected, and wherein the camshaft is adjusted to the small valve lift, to keep the operating state of the internal combustion engine essentially constant.

9. The method as claimed in claim 1, wherein the camshaft is adjusted in an overrun mode of the internal combustion engine to prevent valve overlaps.

10. The method as claimed in claim 9, wherein a braking effect of the internal combustion engine is kept almost constant despite an opening of the throttle flap.

11. The method as claimed in claim 1, wherein the camshaft is adjusted to a small valve lift, if the internal combustion engine is in an overrun mode, to keep a braking effect of the internal combustion engine essentially constant.

12. The method as claimed in claim 11, wherein the braking effect is essentially constant regardless the opening of the throttle flap.

* * * * *